United States Patent
Nashed et al.

(10) Patent No.: US 10,900,206 B1
(45) Date of Patent: Jan. 26, 2021

(54) VAPOR-LIQUID MIXTURE-BASED CONSTANT PRESSURE HYDROPNEUMATICS SYSTEM

(71) Applicants: Ramses S. Nashed, Tierra Verde, FL (US); Jeremy Nashed, Tierra Verde, FL (US)

(72) Inventors: Ramses S. Nashed, Tierra Verde, FL (US); Jeremy Nashed, Tierra Verde, FL (US)

( * ) Notice: Subject to any disclaimer, the term of this patent is extended or adjusted under 35 U.S.C. 154(b) by 0 days.

(21) Appl. No.: 16/787,880

(22) Filed: Feb. 11, 2020

(51) Int. Cl.
  *E03B 11/04* (2006.01)
  *B65D 83/00* (2006.01)
  *B67D 1/04* (2006.01)
  *B67D 3/00* (2006.01)
  *B67D 1/08* (2006.01)

(52) U.S. Cl.
  CPC .......... *E03B 11/04* (2013.01); *B65D 83/0061* (2013.01); *B67D 1/0462* (2013.01); *B67D 3/0067* (2013.01); *B67D 2001/0827* (2013.01)

(58) Field of Classification Search
  CPC ... E03B 11/04; B65D 83/0061; B67D 3/0067; B67D 1/0462; B67D 2001/0827
  See application file for complete search history.

(56) References Cited

U.S. PATENT DOCUMENTS 3,294,289 A * 12/1966 Bayne ................. B67D 1/0462
    222/95
4,049,158 A * 9/1977 Lo ....................... B65D 83/625
    222/95
4,159,789 A * 7/1979 Stoody ................... B65D 83/68
    222/148
RE30,093 E * 9/1979 Burger .................. B65D 83/62
    222/192
4,771,918 A * 9/1988 Haggart ............. B65D 83/0061
    222/95

(Continued)

FOREIGN PATENT DOCUMENTS

CN    102734636 B    10/2015
EP     1990533 B1    11/2009

(Continued)

OTHER PUBLICATIONS

Translation of CN102734636B with a publication date of Oct. 28, 2015; Applicant: Zhang Zhihong.

(Continued)

*Primary Examiner* — Frederick C Nicolas
(74) *Attorney, Agent, or Firm* — Smith & Hopen, P.A.; Paul Murty

(57) ABSTRACT

A constant pressure system includes a pressure vessel with a vapor-liquid mixture used to provide pressure forces instead of compressed air that is typically used. The vapor-liquid mixture can be a number of substances, such as nitrous oxide, so long as the mixture exists in both the liquid and vapor phases. Importantly, the vapor-liquid mixture must maintain a constant pressure during the dispensing of fluids from the tank, so that the fluids are dispensed at the same constant pressure. As a result, the fluids within the tank can be dispensed at the same pressure as that of the vapor-liquid mixture within the tank, or scaled to a higher or lower pressure value through the use of a pressure-converter valve within the system.

18 Claims, 5 Drawing Sheets

(56) References Cited

U.S. PATENT DOCUMENTS

| | | | | |
|---|---|---|---|---|
| 4,796,788 | A * | 1/1989 | Bond | B65D 77/067 222/105 |
| 4,854,483 | A * | 8/1989 | Haggart | B65D 83/0061 222/95 |
| 6,170,715 | B1 * | 1/2001 | Evans | B67D 1/0001 222/340 |
| 6,789,699 | B2 * | 9/2004 | Clark | B01F 15/0462 222/1 |
| 8,378,521 | B2 | 2/2013 | Rufer et al. | |
| 8,424,723 | B2 * | 4/2013 | Doelman | B67D 1/1245 222/105 |
| 8,869,842 | B2 * | 10/2014 | Smith | B65B 31/025 141/3 |
| 10,082,157 | B2 * | 9/2018 | Murphy | F15B 1/08 |
| 2003/0066847 | A1 * | 4/2003 | Towfighi | F17C 13/002 222/402.1 |
| 2007/0241133 | A1 * | 10/2007 | Smith | B05B 11/0078 222/129 |
| 2012/0318830 | A1 * | 12/2012 | Lim | B65D 83/663 222/402.1 |
| 2014/0117043 | A1 * | 5/2014 | Ware | B67D 7/72 222/95 |
| 2015/0166253 | A1 * | 6/2015 | Nomura | B65B 3/00 222/402.1 |

FOREIGN PATENT DOCUMENTS

| | | |
|---|---|---|
| KR | 102007688 B1 | 8/2019 |
| WO | 2013175301 A2 | 11/2013 |

OTHER PUBLICATIONS

Translation of EP1990533B1 with a publication date of Nov. 18, 2009; Applicant: Robert Bosch GmbH.

Translation of KR102007688B1 with a publication date of Aug. 6, 2019; Applicant: C & G Hi-Tech Co., Ltd.

Screenshot of video on Youtube of How Hydrostor A-CAES Technology Works (2018). Published on Aug. 30, 2018. Downloaded on Apr. 7, 2020. https://www.youtube.com/watch?v=kvyuzSto0vU.

* cited by examiner

VAPOR-LIQUID MIXTURE-BASED CONSTANT PRESSURE HYDROPNEUMATICS SYSTEM

BACKGROUND OF THE INVENTION

1. Field of the Invention

This invention relates, generally, to pressure systems. More specifically, it relates to a constant pressure output hydropneumatics system including one or more pressure vessels with a vapor-liquid mixture included therein, accomplished by maintaining a volume of a liquid, such as nitrous oxide, within the vessel.

2. Brief Description of the Prior Art

Currently, if a substance, such as water, is stored in a pressurized tank, a pump is employed to increase the pressure of the substance. The substance is then stored in a pressurized tank that includes a bladder and a separate chamber filled with compressed air. The compressed air maintains the pressure of the water within the tank. When a dispenser, such as a faucet, is opened within the system lines, the pressurized water flows out of the bladder of the tank toward the dispenser. Simultaneously, the pressure of the water in the tank gradually decreases until a threshold low pressure level is reached within the tank. At the low pressure level, the pump restarts to input additional pressurized water until a high pressure level is reached, which may be a target, ideal pressure for the water within the tank.

While such prior art systems generally succeed in supplying pressurized water to an end user, the system requires frequently cycling of the pump as the pressure level continuously fluctuates between high-and-low pressure levels. In addition to putting increased load on the pump, leading to increased wear and tear, the system suffers from gradual decreases in pressure as the storage fluid is dispensed, such that only a small amount of the fluid is dispensed at the ideal pressure.

Attempts have been made to maintain liquids for dispensing purposes under constant pressure. For example, KR102007688 teaches a constant pressure system including nitrogen gas ($N_2$) that is added to or exhausted from the system to maintain constant pressure. However, because the system requires constant adjustments to be made to nitrogen gas levels, additional pumps are required and pumps are frequently cycled, resulting in a highly complex system. As such, while the system may output a stored liquid at a relatively constant pressure, complicated adjustments to nitrogen gas levels are required to achieve such an output.

In addition to using compressed gasses to dispense fluids under pressure, attempts have been made to utilize compresses air in energy storage systems. Such systems typically include one or more large reservoirs of fluid that are used to maintain the compression of the air, so as to store potential energy, depending on the energy requirements of the grid to which the system is connected. To maintain pressure throughout the system, as well as to quickly utilize the stored energy when required by the system (for example, when an end user demands energy for a particular application), such systems typically employ large storage vessels, often existing underground, to implement a pressure differential from which energy can be converted. However, existing systems utilize compressed air and are therefore much more complicated than necessary for energy storage purposes. The complicated nature of the systems results in increased costs and decreased efficiencies, as well as a substantially large footprint resulting from the need for large underground storage vessels, such as caverns as well as large reservoirs of water.

Accordingly, what is needed is a hydropneumatics system in which constant pressure is achieved without the need for complicated adjustments to stored gas contents, but rather constant pressure is achieved by utilizing the self-regulating nature of a vapor-liquid mixture within a storage tank. What is also needed is an energy storage solution utilizing the vapor-liquid mixture to store energy in a usable form without the need for a large reservoir of water to maintain compression of compressed air. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a constant pressure vessel including a vapor-liquid mixture is now met by a new, useful, and nonobvious invention.

The novel structure includes a pressure vessel with a plurality of walls sealing an internal chamber. A bladder is disposed within the internal chamber and is separated from at least one of the plurality of walls by a space. The bladder includes an amount of a fluid therein, such as water for consumption or compressed gas for energy storage. A vapor-liquid mixture-based substance, such as nitrous oxide, is disposed within the space between the plurality of walls of the pressure vessel and the bladder. The vapor-liquid mixture-based substance includes an amount of molecules in a liquid phase and an amount of molecules in a vapor phase. The vapor-liquid mixture-based substance maintains a constant pressure value, such as 750 pounds per square inch, within the pressure vessel (when nitrous oxide is the vapor-liquid mixture used), and the fluid is configured to be pressurized to the constant pressure value by the vapor-liquid mixture-based substance. As the fluid is drawn down, more of the vapor-liquid mixture converts from a liquid to a vapor to maintain the constant pressure. Similarly, as the fluid is replaced in the bladder, more of the vapor-liquid mixture converts from a vapor to a liquid to maintain the constant pressure.

In an embodiment, at least one dispensing conduit is in fluidic communication with the bladder. The dispensing conduit is configured to translate the fluid from the pressure vessel to a dispensing location. In an embodiment, one or more dispensing locations are located within a building, and the pressure vessel is in fluidic communication with each of the dispensing locations, providing fluid at constant pressure throughout the building. A pressure converter valve (or nozzle) may be disposed within the dispensing conduit, with the pressure converter valve being disposed between the pressure vessel and the dispensing location. The pressure converter valve is configured to increase or decrease the pressure value of the fluid.

A method of dispensing fluid at a constant pressure is provided, including a step of storing an amount of fluid within a portion of an interior compartment of a pressure vessel. The portion of the pressure vessel is partially defined by an expandable upper wall that is spaced apart from at least one interior wall of the pressure vessel. As such, a space is created between the expandable upper wall and one or more of the interior walls of the pressure vessel. The space between the pressure vessel and the upper wall of the portion of interior compartment is filled with a vapor-liquid mixture-based substance, such as nitrous oxide. A pressure value of the pressure vessel is selected by the choice of the vapor-liquid mixture-based substance is used, and can be fine-tuned by adjusting a temperature of the pressure vessel. The pressure value is maintained as a constant pressure value by ensuring that at least a portion of the vapor-liquid mixture-based substance is in a liquid phase. The constant pressure value is imparted on the fluid via the vapor-liquid mixture-based substance. The pressurized fluid is dispensed at the constant pressure value via at least one dispensing conduit.

In an embodiment, the method includes a step of converting a portion of the vapor-liquid mixture-based substance from a vapor phase to the liquid phase by compressing the vapor-liquid mixture-based substance. The compression results from adding an additional amount of fluid to the interior compartment, thereby expanding the separation wall within the pressure vessel, reducing the space between the separation wall and the interior walls of the pressure vessel and compressing the vapor-liquid mixture-based substance. Similarly, a portion of the vapor-liquid mixture-based substance is convertible from the liquid phase to a vapor phase by decompressing the vapor-liquid mixture-based substance, such as by dispensing the fluid and increasing the space between the separation wall and the pressure vessel. Throughout the compression and decompression cycles, the pressure within the vessel remains constant due to the vapor-liquid mixture.

An object of the invention is to maintain a constant pressure within a vessel with little maintenance and pump requirements, instead relying on the use of a vapor-liquid mixture to create constant pressure within the pressure vessel, such that liquids can be dispensed without the pressure vessel dropping in pressure. Another object of the invention is to store energy to allow the stored energy to be drawn down at a constant pressure by using a vapor-liquid mixture with a reduced footprint.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The present invention includes a vapor-liquid mixture instead of compressed air as the pressure vehicle within a tank. The vapor-liquid mixture can be a number of substances, so long as the mixture exists as a liquified gas at the desired temperature and pressure; in a particular embodiment, is nitrous oxide. Importantly, the vapor-liquid mixture must maintain a constant pressure during the dispensing of fluids from the tank, so that the fluids are dispensed at the same constant pressure. For example, nitrous oxide has a pressure level of approximately 750 pounds per square inch (PSI) at room temperature, so long as there is an amount of nitrous oxide that is in the liquid phase in the pressure tank, in equilibrium with the nitrous oxide in the vapor phase within the tank. As a result, the fluid within the tank can be dispensed at the same pressure as that of the vapor-liquid mixture within the tank, or scaled to a lesser pressure value through the use of a pressure-reducing valve within the system. In an alternative embodiment, the fluid can be dispensed at a pressure greater than that of the vapor-liquid mixture by using an additional pressure valve or a nozzle within the system. As used herein, the term "room temperature" means a temperature value of approximately 20-25° C.±15%.

Figure 1:
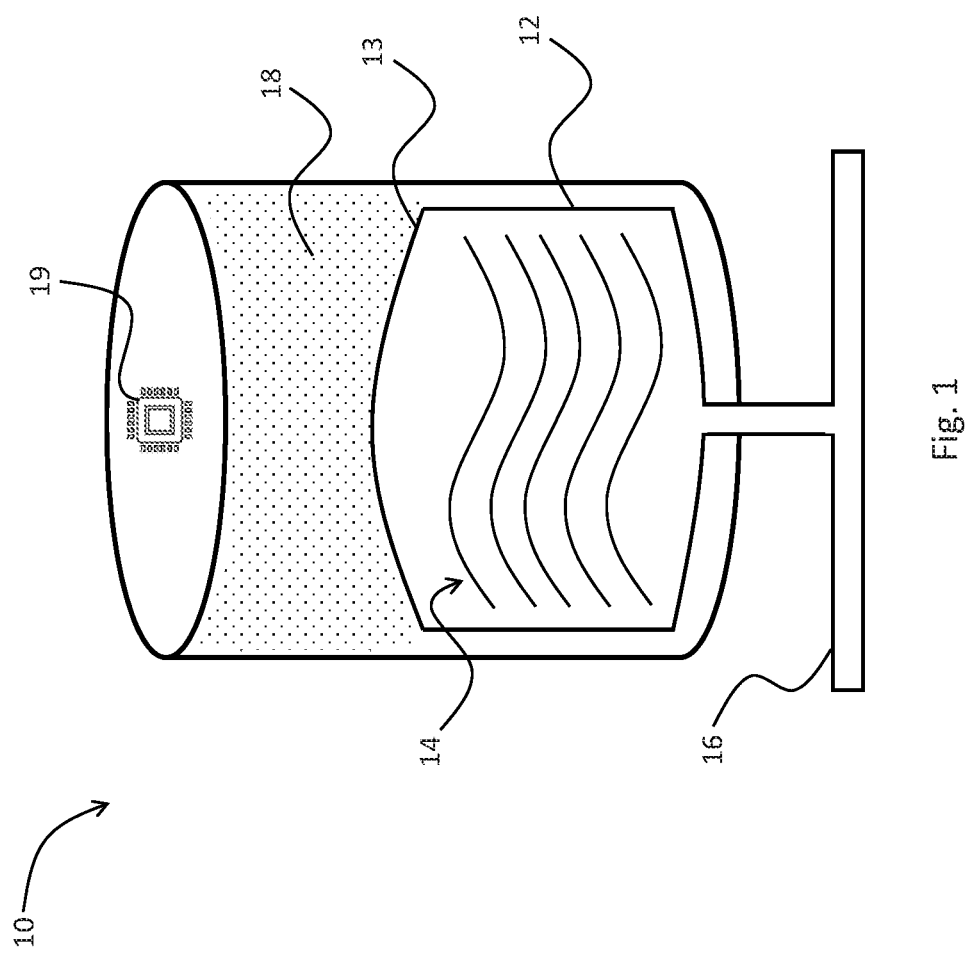
FIG. 1 is a perspective view of a vapor-liquid mixture-based constant pressure vessel, in accordance with an embodiment of the present invention.

As shown in FIG. 1, constant pressure vessel 10 resembles a typical prior art pressure vessel, including a plurality of walls sealing an internal chamber. Bladder 12 is disposed within the internal chamber of constant pressure vessel 10 and contains an amount of dispensing fluid 14 (alternatively referred to as fluid 14) disposed within the interior walls of bladder 12. Bladder 12 is in fluidic communication with one or more dispensing conduits 16, such that dispensing fluid 14 can flow from bladder 12 into dispensing conduits 16 for translation to a dispensing location, such as a faucet. In an embodiment, a one-way fluid valve is disposed between bladder 12 and dispensing conduits 16, which, when actuated, allows dispensing fluid 14 to flow out of bladder 12 and into dispensing conduits 16. In another embodiment, a two-way valve is employed to allow bidirectional translation of dispensing fluid 14 into and out of bladder 12 and dispensing conduits 16. One or more optional pressure-altering valves may be disposed within dispensing conduits 16 to increase or decrease a pressure of dispensing fluid 14, depending on a desired dispensing pressure of fluid 14.

Bladder 12 has a volume smaller than a volume of constant pressure vessel 10, such that an amount of space resides between at least one surface of bladder 12, such as flexible separation wall 13, and one or more of the interior walls of constant pressure vessel 10. As used herein, the term "flexible" means being capable of bending or folding without breaking. As such, bladder 12 is configured to receive one or more pressure forces within constant pressure vessel 10 from substances disposed in the space residing between bladder 12 and the interior walls of constant pressure vessel 10. The pressure forces exerted on bladder 12 by substances within the space surrounding bladder 12 are configured to pressurize fluid 14 within bladder 12 for dispensing.

It is known within the art to dispose substances within a pressure vessel to increase and decrease pressure values within the vessel, particularly of the fluid within the vessel. Typically, the substances within the vessel are air molecules that are compressed and decompressed as a fluid level within a bladder increases and decreases, respectively. Such a system relies on fluctuations between high and low fluid levels within the bladder (or within the chamber itself, depending on the configuration of the vessel) to dictate a pressure value of the compressed air, which in turn dictates a pressure value of the fluid of the system. As such, the system oscillates between high pressure levels and low pressure levels depending on the amount of fluid within the vessel. As a result, the compression level of the compressed air within the vessel changes due to the changes in the amount of fluid within the vessel.

However, as shown in FIG. 1, the substances disposed within constant pressure vessel 10 are not compressed air, but rather are one or more vapor-liquid mixture-based substances 18 (alternatively referred to a vapor-liquid mixture 18). Vapor-liquid mixture 18 includes one or more molecules or compounds that exists in both vapor and liquid phases, such that both the vapor and liquid phases of the substance reside within constant pressure vessel 10 in the space surrounding bladder 12. The use of vapor-liquid mixture 18 is such that constant pressure vessel 10 maintains a constant pressure value (such as by maintain a relatively a constant temperature of ±15%). For example, if the temperature is increased or decreased, the ultimate pressure value will also be constant; however, the pressure value will increase or decrease in relation to the temperature change, with the pressure value leveling off to a constant value thereafter. Moreover, the choice of vapor-liquid mixture 18 during manufacture determines the constant pressure value at room temperature, with the pressure value remaining constant throughout the use of vessel 10 at a constant room temperature. In an embodiment, vapor-liquid mixture 18 is comprised of nitrous oxide ($N_2O$), which exists as both a vapor and a liquid within constant pressure vessel 10. As such, the nitrous oxide imparts a constant pressure on bladder 12 regardless of an amount of fluid 14 within bladder 12. Similarly, a pressure value of fluid 14 remains constant, so long as there is an amount of nitrous oxide that is in the liquid phase in the pressure tank, in equilibrium with the nitrous oxide in the vapor phase within the system. Moreover, an advantage of using nitrous oxide or a similar substance to pressurize the system is that nitrous oxide is not harmful if consumed by a human being, as it is currently used in consumable food items.

To that end, when bladder 12 within the system contains a reduced amount of dispensing fluid 14, vapor-liquid mixture 18 fills the entire volume of constant pressure vessel 10. At this point, bladder 12 must receive replacement fluid 14 to be refilled for subsequent dispensing. As such, a pump cycles to fill bladder 12 with fluid 14. As bladder 12 fills with fluid 14 and expands within vessel 10 to reduce the amount of space between separation wall 13 of bladder 12 and the interior walls of vessel 10, vapor-liquid mixture 18 is compressed within the reduced space. As vapor-liquid mixture 18 compresses, a portion of mixture 18 experiences a phase change from the vapor phase to the liquid phase as equilibrium is maintained within the system, thereby maintaining the constant pressure within vessel 10. In this state, bladder 12 is filled with fluid 14. Once bladder 12 is filled to a sufficient level, the pump ceasing cycling until the next replenishment phase is required. As such, the volume of fluid 14 within bladder 12 is the parameter that controls the cycling of the pump.

Similarly, as fluid 14 is dispensed from vessel 10 via dispensing conduits 16, bladder 12 contracts. This may be accomplished, for example, by increasing the space between separation wall 13 and the interior walls of constant pressure vessel 10 as bladder 12 contracts with fluid 14 leaving bladder 12. As the space between bladder 12 and the interior walls of vessel 10 increases, vapor-liquid mixture 18 decompresses, and a portion of mixture 18 experiences a phase change from the liquid phase to the vapor phase. At least a portion of mixture 18 remains in the liquid phase. As such, the system can cycle between the liquid phase and the vapor phase of vapor-liquid mixture 18, thereby maintaining a constant pressure within vessel 10 regardless of the volume of fluid 14 within bladder 12.

Since the system relies on vapor-liquid mixture 18 to maintain a constant pressure, vessel 10 operates differently from prior art pressure chambers. For example, while a traditional pressure chamber relies on the amount of fluid within the chamber to determine the variable pressure therein, vessel 10 maintains a constant pressure by relying on vapor-liquid mixture 18. As a result, once a temperature is determined, the pressure within vessel 10 is set at a constant pressure value that is maintained throughout dispensing. While dispensing fluid 14, under a traditional system, the pressure value would drop as the amount of fluid 14 decreases, and would subsequently increase when fluid 14 is refilled into the system. However, by employing vapor-liquid mixture 18 instead of the traditional compressed air, the pressure remains constant, and the feedback loop for refilling fluid 14 into bladder 12 is instead based on the volume of vapor-liquid mixture 18. Accordingly, volume sensor 19 is disposed within vessel 10 and outside bladder 12 to measure a volume associated with vapor-liquid mixture 18. Volume sensor 19 is in communication with a pump that refills bladder 12 with fluid 14. In an embodiment, volume sensor 19 is a strain gauge used to measure strain on bladder 12 due to changes in amounts of fluid 14. Moreover, volume sensor 19 may be an ultrasonic sensor disposed outside of vessel 10 to measure a volume of fluid 14 disposed within the internal chamber.

To aid in maintaining a constant temperature within the system, one or more temperature control components, such as a heater, refrigeration cycle, or a digital controller, can be implemented to measure and adjust the temperature within vessel 10 as needed. In addition, as shown in FIG. 1, the portion of vessel 10 that contains vapor-liquid mixture 18 is insulated to ensure a stable temperature, and thereby ensure a stable pressure. FIG. 1 includes thick outlining lines for vessel 10 as compared with that of bladder 12, indicating that the walls of vessel 10 are thicker than those of bladder 12. The insulation of vessel 10 can be accomplished by methods known within the art, such as by increasing a thickness of the walls or by lining the walls with a liner of insulating material, such as fiberglass, mineral wool, thermoplastics, or other insulating materials. It should be appreciated that, while FIG. 1 depicts vapor-liquid mixture 18 only within a portion of vessel 10, mixture 18 can disperse throughout the entirety of vessel 18, including by surrounding bladder 12. In addition, it should be appreciated that as bladder 12 decreases in volume as fluid 14 is dispensed throughout the system, vapor-liquid mixture 18 can disperse into the increased space between bladder 12 and the interior walls of vessel 10. As such, in an embodiment, the entirety of the interior walls of vessel 10 are insulated to maintain a constant temperature. Moreover, in an embodiment, the exterior walls of vessel 10 are insulated to maintain a constant temperature.

Figure 2A:
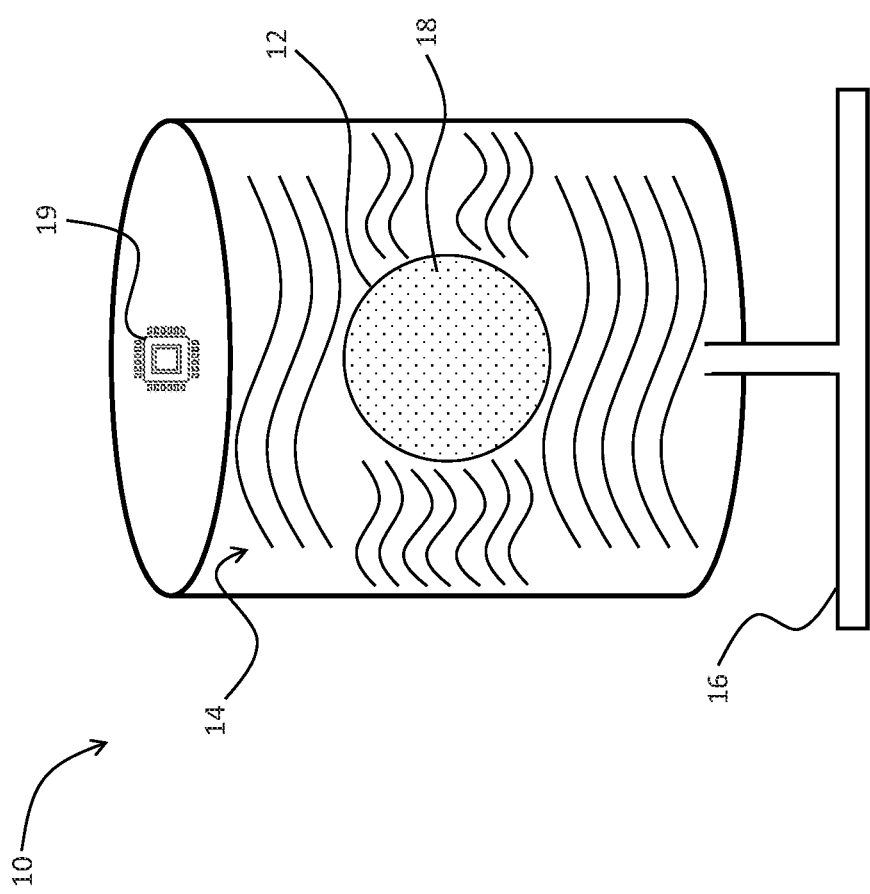
FIG. 2A is a perspective view of a vapor-liquid mixture-based constant pressure vessel, including a vapor-liquid mixture surrounded by a full amount of dispensing fluid, in accordance with an embodiment of the present invention
Figure 2B:
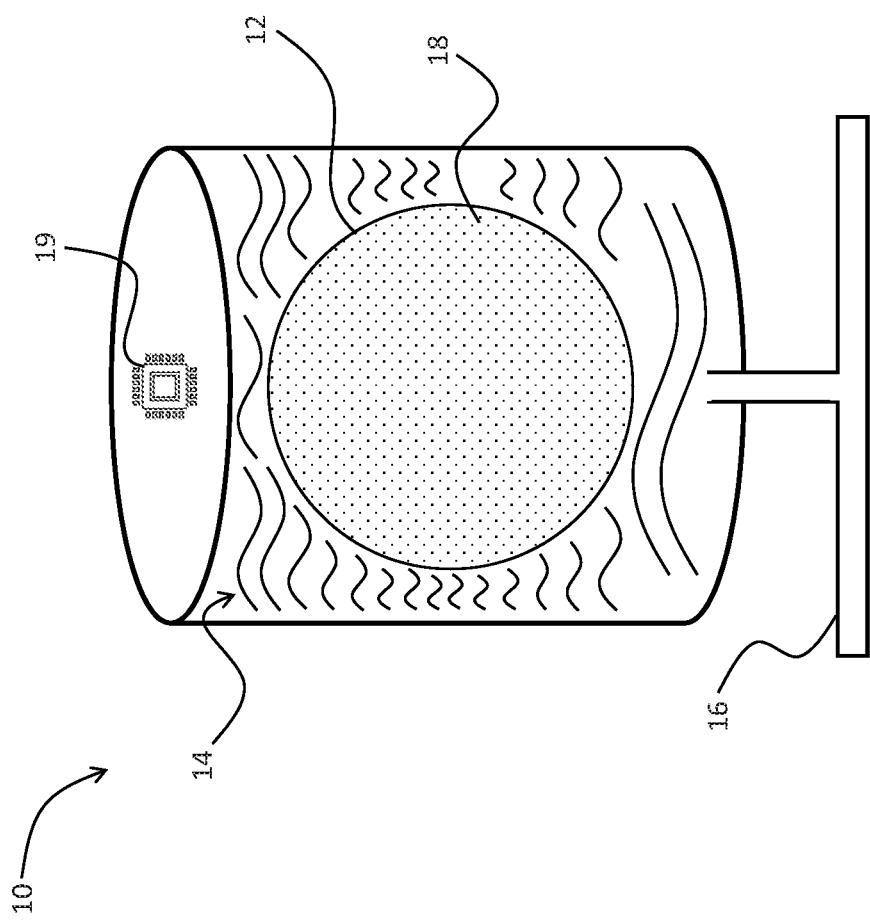
FIG. 2B is a perspective view of the vapor-liquid mixture-based constant pressure vessel of FIG. 2A, including the vapor-liquid mixture surrounded by a partially-depleted amount of dispensing fluid.

FIGS. 2A-2B depict an alternative embodiment of constant pressure vessel 10 that shares the same functionality of vessel 10 as described above and depicted in FIG. 1. Whereas FIG. 1 depicts vessel 10 including bladder 12 surrounded by vapor-liquid mixture 18, an embodiment, as depicted in FIGS. 2A-2B, includes fluid 14 within bladder 12 that surrounds vapor-liquid mixture 18. As shown in FIG. 2A, fluid 14 fills the internal chamber of vessel 10 and surrounds vapor-liquid mixture 18, which is disposed within a central portion of the internal chamber. As fluid 14 fills vessel 10, the walls of bladder 12 expand to increase the volume of bladder 12, thereby compressing vapor-liquid mixture 18 in a central portion of the internal chamber, and thereby causing a portion of mixture 18 to experience a phase change from the vapor phase to the liquid phase. Similarly, as shown in FIG. 2B, fluid 14 is dispensed from vessel 10 at a constant pressure, thereby contracting the walls of bladder 12 to decrease the volume of bladder 12. As bladder 12 contracts, a portion of vapor-liquid mixture 18 decompresses and experiences a phase change from the liquid phase to the vapor phase. With vapor-liquid mixture 18 disposed within a central portion of the interior chamber, vessel 10 does not require insulation, since fluid 14 acts as an insulator on mixture 18, and since a temperature value associated with mixture 18 will not significantly vary.

Figure 3:
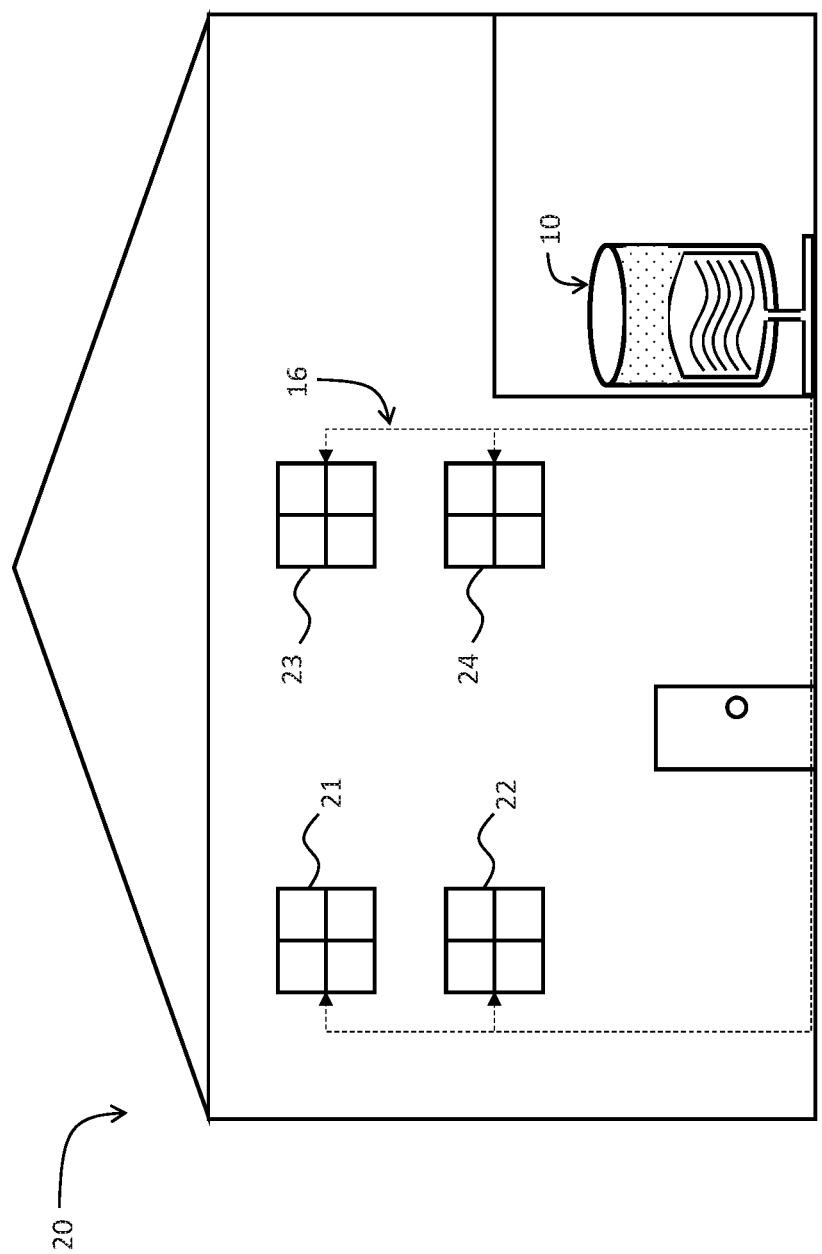
FIG. 3 is a perspective view of a whole house water pressure solution including the vapor-liquid mixture-based constant pressure vessel of FIG. 1.

As shown in FIG. 3, constant pressure vessel 10 as described in detail above can be implemented as a whole-house or whole-facility system to supply fluid 14 to a plurality of dispensing locations at the constant pressure previously described. FIG. 3 depicts an embodiment of a constant pressure system including building 20 and a plurality of dispensing locations or dispensers 21, 22, 23, 24. It should be appreciated that, while building 20 is depicted in FIG. 3 as a housing unit, with dispensers 21, 22, 23, 24 being various locations within the housing unit (such as bathroom faucets, kitchen sinks, baths, shower heads, and other fluid dispensers), building 20 can be any variety of building that includes the need to dispense fluid therein. As shown in FIG. 3, constant pressure vessel 10 is disposed within building 20 and is in fluidic communication with a plurality of dispensers 21, 22, 23, 24 via dispensing conduits 16, described in detail above. As such, fluid 14 within vessel 10 can be cycled to each dispensing location at a constant pressure for use by an end user, without any of the dispensing locations experiencing a drop in pressure due to the demand and use of fluid 14.

While the systems are described above as bladder-based systems, it should be appreciated that the same systems can exist with diaphragm-based pressure vessels and vessels without a bladder or a diaphragm, so long as a vapor-liquid mixture exists within the vessel. For example, bladder 12 includes separation wall 13 that forms a boundary between bladder 12 and the interior walls of constant pressure vessel 10. However, in an alternative embodiment, separation wall 13 can be a diaphragm separating a fluid-containing portion of constant pressure vessel 10 from a vapor-liquid mixture-containing portion of constant pressure vessel 10.

Figure 4:
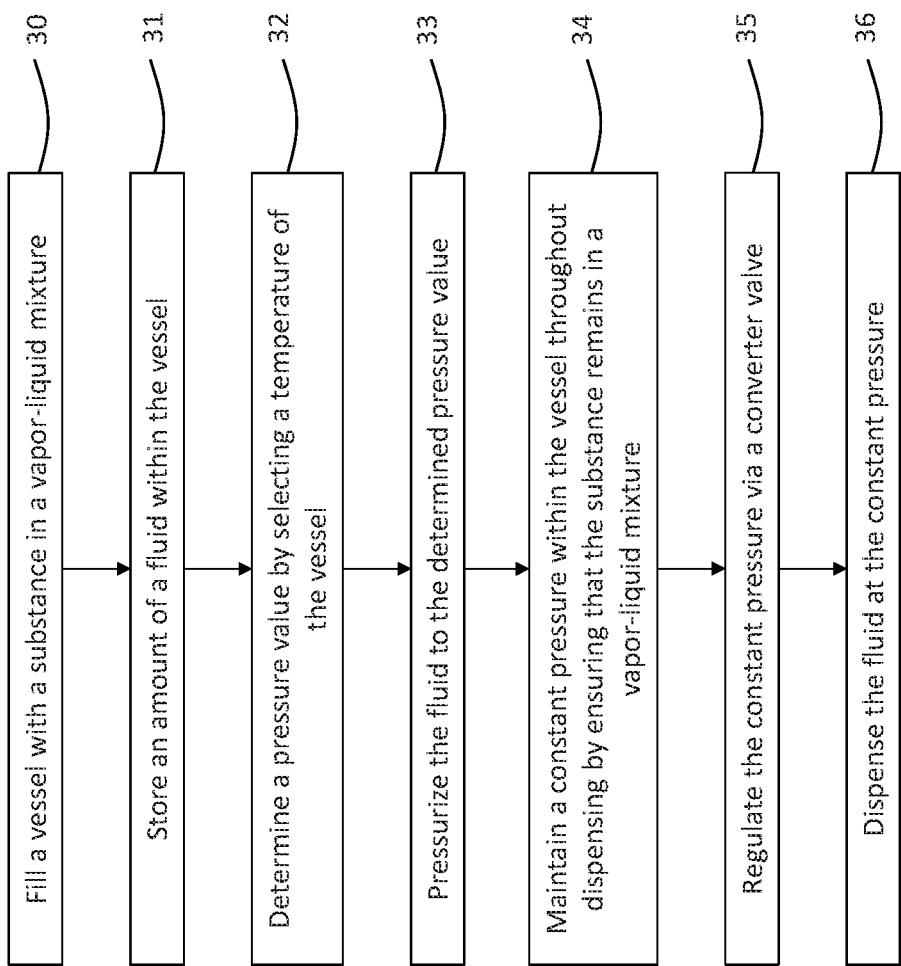
FIG. 4 is a process flow diagram depicting a method of providing fluid under a constant pressure, in accordance with an embodiment of the present invention.

Referring now to FIG. 4, in conjunction with FIGS. 1-3, an exemplary process-flow diagram is provided, depicting a method of dispensing a fluid at a constant pressure. The steps delineated in the exemplary process-flow diagram of FIG. 4 are merely exemplary of an order of dispensing a fluid at a constant pressure. The steps may be carried out in another order, with or without additional steps included therein.

As shown in FIG. 4, the method includes step 30, which includes filling a vessel with a substance that exists in a vapor-liquid mixture. As described above, the substance can be nitrous oxide; however, the substance can be any substance that is configured to reside within the vessel in a vapor-liquid mixture, such that the mixture has a high vapor pressure and will maintain an equilibrium between the liquid phase and the vapor phase at the full range of volumes of the pressure vessel. During step 31, which can be performed before, during, or after step 30, an amount of a fluid is stored within the vessel. As described above, the fluid can be a consumable fluid, such as water, particularly within a building setting; however, it should be appreciated that the fluid can be configured for energy usage, such as a compressed gas kept under pressure to be used as fuel energy consumption.

During optional step 32, a pressure value within the vessel is determined by selecting a temperature of the vessel; as the temperature changes, the pressure value can change. However, so long as at least a portion of the vapor-liquid mixture exists in the liquid phase, the pressure within the vessel can remain at the constant pressure desired. The fluid is pressurized to the determined pressure value during step 33. During step 34, the pressure within the vessel is maintained at a constant pressure value throughout the dispensing process, during which it is ensured that the substance remains in the vapor-liquid mixture.

The fluid within the vessel is dispensed in a pressurized format via dispensing conduits, with the fluid being configured for consumption or energy usage purposes. During an optional step 35, a pressure converter valve is employed between the vessel and the dispenser to either increase or decrease a pressure value of the fluid. For example, if the vapor-liquid mixture is nitrous oxide having a pressure value of 750 PSI, it may be desirable to reduce the pressure value prior to dispensing fluid, so that the fluid is not dispensed at an end user location at 750 PSI, but rather at a lesser pressure value (that remains constant during fluid flow). During step 36, the fluid is dispensed for use by an end user, importantly at a constant pressure as maintained during step 34.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A pressure vessel comprising:
    a plurality of walls sealing an internal chamber;
    a bladder disposed within the internal chamber and separated from at least one of the plurality of walls by a space, the bladder including a fluid disposed therein, the fluid selected from the group consisting of a consumable fluid and a compressed gas configured for energy storage and usage; and
    a singular vapor-liquid mixture-based substance disposed within the space between the plurality of walls of the pressure vessel and the bladder, the singular vapor-liquid mixture-based substance being nitrous oxide, such that the singular vapor-liquid mixture-based substance is a different substance from the fluid disposed within the bladder, the singular vapor-liquid mixture-based substance including an amount of molecules in a liquid phase and an amount of molecules in a vapor phase,
    wherein the singular vapor-liquid mixture-based substance maintains a constant pressure value within the pressure vessel, and
    wherein the fluid is configured to be pressurized to the constant pressure value by an equilibrium state of the singular vapor-liquid mixture-based substance.

2. The pressure vessel of claim 1, wherein the constant pressure value is 750 pounds per square inch at room temperature.

3. The pressure vessel of claim 1, further comprising a volume sensor disposed within the internal chamber, the volume sensor configured to measure a volume of the bladder.

4. The pressure vessel of claim 1, further comprising at least one dispensing conduit in fluidic communication with the bladder, the at least one dispensing conduit configured to translate the fluid from the pressure vessel to a dispensing location.

5. The pressure vessel of claim 4, further comprising a pressure converter valve disposed within the at least one dispensing conduit between the pressure vessel and the dispensing location, the pressure converter valve configured to decrease the pressure value of the fluid.

6. The pressure vessel of claim 1, wherein the consumable fluid is water.

7. The pressure vessel of claim 1, further comprising an insulation layer disposed on the plurality of walls sealing the internal chamber, the insulation layer configured to maintain a constant temperature value within the vessel, thereby maintaining the constant pressure value.

8. A constant pressure system comprising:
    a building including a plurality of dispensing locations;
    a constant pressure vessel in fluidic communication with the plurality of dispensing locations, the constant pressure vessel including:
        a plurality of walls sealing an internal chamber;
        a bladder disposed within the internal chamber and separated from at least one of the plurality of walls by a space, the bladder including a fluid disposed therein, the fluid selected from the group consisting of a consumable fluid and a compressed gas configured for energy storage and usage; and
        a singular vapor-liquid mixture-based substance disposed within the space between the plurality of walls of the constant pressure vessel and the bladder, the singular vapor-liquid mixture-based substance being nitrous oxide, such that the singular vapor-liquid mixture-based substance is a different substance from the fluid disposed within the bladder, the singular vapor-liquid mixture-based substance including an amount of molecules in a liquid phase and an amount of molecules in a vapor phase; and
    at least one dispensing conduit secured to each of the constant pressure vessel and the plurality of dispensing locations, such that the at least one dispensing conduit is an intermediary connector between the constant pressure vessel and the plurality of dispensing locations, the at least one dispensing conduit configured to translate the fluid from the constant pressure vessel to at least one of the plurality of dispensing locations,
    wherein the singular vapor-liquid mixture-based substance maintains a constant pressure value within the constant pressure vessel, and
    wherein the fluid is configured to be pressurized to the constant pressure value by an equilibrium state of the singular vapor-liquid mixture-based substance.

9. The constant pressure system of claim 8, wherein the constant pressure value is 750 pounds per square inch at room temperature.

10. The constant pressure system of claim 8, further comprising a volume sensor disposed within the internal chamber, the volume sensor configured to measure a volume of the bladder.

11. The constant pressure system of claim 8, further comprising a pressure converter valve disposed within the at least one dispensing conduit between the constant pressure vessel and the at least one dispensing location, the pressure converter valve configured to decrease the constant pressure value of the fluid.

12. The constant pressure system of claim 8, wherein the consumable fluid is water.

13. A method of dispensing fluid at a constant pressure comprising the steps of:
    storing an amount of fluid within a portion of an interior compartment of a pressure vessel, the portion at least partially defined by a flexible separation wall that is spaced apart from at least one interior wall of the pressure vessel, thereby creating a space, the fluid selected from the group consisting of a consumable fluid and a compressed gas configured for energy storage and usage;

filling the space between the pressure vessel and the separation wall of the portion of interior compartment with a singular vapor-liquid mixture-based substance, the singular vapor-liquid mixture-based substance being nitrous oxide, such that the singular vapor-liquid mixture-based substance is a different substance from the fluid disposed within the bladder;

selecting a pressure value of the singular vapor-liquid mixture-based substance;

maintaining the pressure value as a constant pressure value by ensuring that at least a portion of the singular vapor-liquid mixture-based substance is in a liquid phase, thereby maintaining an equilibrium between the liquid phase and a vapor phase of the singular vapor-liquid mixture-based substance;

imparting the constant pressure value on the fluid via the singular vapor-liquid mixture-based substance; and dispensing the fluid at the constant pressure value via at least one dispensing conduit.

14. The method of claim 13, further comprising a step of converting a portion of the singular vapor-liquid mixture-based substance from the vapor phase to the liquid phase while maintaining the constant pressure value due to a phase change from the vapor phase to the liquid phase that maintains the equilibrium between the liquid phase and the vapor phase of the singular vapor-liquid mixture-based substance.

15. The method of claim 14, wherein the step of converting the portion of the singular vapor-liquid mixture-based substance from the vapor phase to the liquid phase results from adding an additional amount of fluid to the interior compartment, thereby decreasing the space between the separator wall and the pressure vessel.

16. The method of claim 13, further comprising a step of converting a portion of the singular vapor-liquid mixture-based substance from the liquid phase to the vapor phase while maintaining the constant pressure value due to a phase change between the liquid phase and the vapor phase that maintains the equilibrium between the liquid phase and the vapor phase of the singular vapor-liquid mixture-based substance.

17. The method of claim 16, wherein the step of converting the portion of the singular vapor-liquid mixture-based substance from the liquid phase to the vapor phase results from the step of dispensing the fluid and expanding the space between the separator wall and the pressure vessel.

18. The method of claim 13, further comprising a step of changing a temperature value within the pressure vessel to change the pressure value of the singular vapor-liquid mixture-based substance.

* * * * *